No. 889,894. PATENTED JUNE 9, 1908.
H. G. BERENTSEN.
CLAMPING DEVICE.
APPLICATION FILED JULY 9, 1906.

WITNESSES:
C. L. Belcher
Otto S. Schairer

INVENTOR
Hans Gustav Berentsen
BY
Ashley G. Carr
ATTORNEY

THE NORRIS PETERS CO., WASHINGTON, D. C.

UNITED STATES PATENT OFFICE.

HANS GUSTAV BERENTSEN, OF PITTSBURG, PENNSYLVANIA, ASSIGNOR TO WESTINGHOUSE ELECTRIC & MANUFACTURING COMPANY, A CORPORATION OF PENNSYLVANIA.

CLAMPING DEVICE.

No. 889,894.  Specification of Letters Patent.  Patented June 9, 1908.

Application filed July 9, 1906.  Serial No. 325,292.

*To all whom it may concern:*

Be it known that I, HANS G. BERENTSEN, a citizen of the United States, and a resident of Pittsburg, in the county of Allegheny and State of Pennsylvania, have invented a new and useful Improvement in Clamping Devices, of which the following is a specification.

My invention relates to devices for securely locking together two detachable parts which are normally designed to operate together as a unit, and it has particular reference to means for locking gear wheels, pinions, or pulleys upon shafts or axles.

The object of my invention is to provide a simple, inexpensive and effective means for so fastening a pinion, gear wheel or pulley to a shaft or axle that it shall be securely held against any possibility of accidental removal, displacement or loosening.

Figure 1:
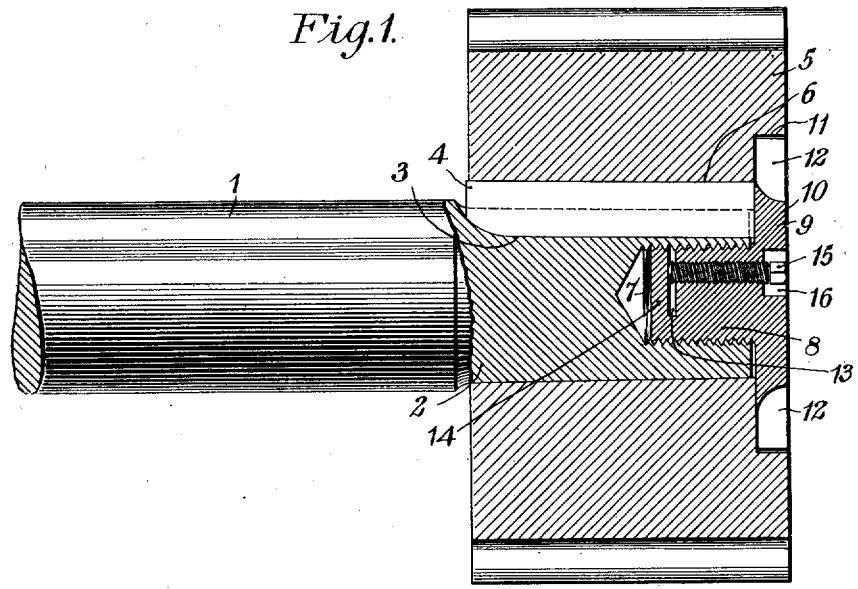
Figure 2:
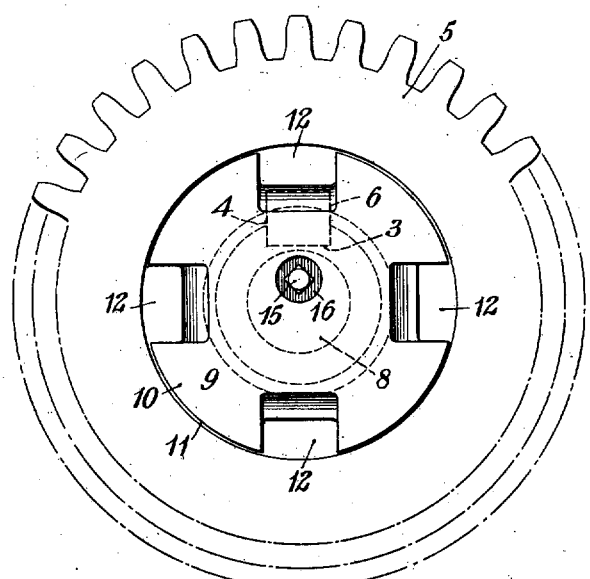

In the accompanying drawing, Figure 1 is a view, partially in side elevation and partially in section, of a portion of a shaft or axle and a pinion fastened thereon in accordance with my invention, and Fig. 2 is a view in end elevation of the parts shown in Fig. 1.

Referring to the parts in detail, the axle 1 is provided with a reduced and preferably slightly tapered end 2 in one side of which is a longitudinal groove 3 for the reception of a spline or feather 4. The object to be mounted upon the reduced end 2, which is here shown as a pinion 5, is provided with a complementary groove 6 which receives approximately one half of the feather spline 4. The outer end of the reduced portion 2 is provided with a screw-threaded recess 7 to receive the screw-threaded portion 8 of a clamping member 9, the head 10 of which is seated in a circular recess 11 in the outer end of the pinion 5 and is provided, at diametrically opposite points, with recesses 12 to receive a spanner wrench in order to facilitate the insertion and removal of the device.

In order that the device 9 may be securely locked against accidental displacement in service, a transverse saw-cut 13 is made in one side near its inner end, the exact location of the same being immaterial but preferably such that the part 14 between the cut and the end of the screw shall be somewhat flexible. A set-screw 15 is inserted in a corresponding screw-threaded hole in the device 9 at one side of the center, in order that its inner end may impinge against the part 14 and press that part against the screw threads of the recess 7 and away from the main part of the device. A recess 16 may be provided in the head 10 in order that free access may be had to the head of the bolt 15.

It will be readily understood that after the parts 5, 14, and 9 are in position so that all are clamped together as parts of a rigid structure, the set-screw 15 may be inserted and forced against the part 14 with such pressure as to insure a binding action of the coöperating screw-threads of the parts 2 and 8 that will prevent accidental loosening or separation of the main parts of the device.

Minor changes as to details, form and arrangement of parts may obviously be made, if desired.

I claim as my invention:

1. The combination with a shaft having a tapered end provided with a key-way at one side and a screw-threaded end recess, of a key fitting into said key-way, a screw that engages said recess and has a head that engages the end of the key, the inner end of the screw being partially severed and means tending to force the severed portion away from the body portion.

2. The combination with a shaft having a key-way at one side and a screw hole in its end, of a key fitting into said key-way, a screw for said screw hole having a head to engage the end of said key, and means for locking said screw in position.

3. The combination with a shaft having a side key-way and an end screw hole, a pinion mounted on said shaft and having a complementary key-way and a key partially located in each key-way, of a screw for said screw hole having a head that fits against the pinion and the key, and means for locking the screw against rotative movement.

4. The combination with a shaft having a tapered end provided with a side key-way and an end screw hole, and a pinion having a key-way and an annular end recess, of a key that fits the two key-ways, a screw for the screw hole the head of which is located in the annular recess in the pinion and rests against the outer end of the key and means for locking the screw against rotative movement.

5. The combination with a shaft having a tapered end provided with an end screw hole, a pinion and means for locking the pinion against rotative movement on the shaft, of a screw in said screw hole having a partially severed end and a head that fits against the outer end of the pinion, and a set screw that extends longitudinally through the body portion of the main screw and impinges against its severed end portion.

In testimony whereof, I have hereunto subscribed my name this 28th day of June, 1906.

HANS GUSTAV BERENTSEN.

Witnesses:
 HENRY R. EDGECOMB,
 BIRNEY HINES.